(12) United States Patent
Trivedi et al.

(10) Patent No.: US 10,502,443 B2
(45) Date of Patent: Dec. 10, 2019

(54) SMART HUMAN MACHINE INTERFACE

(71) Applicant: Ademco Inc., Golden Valley, MN (US)

(72) Inventors: Ishit Trivedi, Bangalore (IN); Nilesh Mahadeorao Akode, Bangalore (IN); Rajat Saha, Bangalore (IN); Patrick Clarke, St. Paul, MN (US); David Emmons, Plymouth, MN (US)

(73) Assignee: Ademco Inc., Golden Valley, MN (US)

( * ) Notice: Subject to any disclaimer, the term of this patent is extended or adjusted under 35 U.S.C. 154(b) by 124 days.

(21) Appl. No.: 15/653,503

(22) Filed: Jul. 18, 2017

(65) Prior Publication Data
US 2019/0024919 A1    Jan. 24, 2019

(51) Int. Cl.
| | | |
|---|---|---|
| *F24F 11/00* | (2018.01) | |
| *G05B 15/02* | (2006.01) | |
| *G06F 3/00* | (2006.01) | |
| *G06F 3/01* | (2006.01) | |
| *G06F 3/0484* | (2013.01) | |
| *G06F 3/0488* | (2013.01) | |

(Continued)

(52) U.S. Cl.
CPC .............. *F24F 11/30* (2018.01); *F24F 11/64* (2018.01); *F24F 11/70* (2018.01); *G05B 15/02* (2013.01); *G06F 3/005* (2013.01); *G06F 3/011* (2013.01); *G06F 3/017* (2013.01); *G06F 3/0482* (2013.01); *G06F 3/0488* (2013.01); *G06F 3/04847* (2013.01); *G06F 3/04886* (2013.01); *G06F 3/167* (2013.01); *F24F 11/52* (2018.01); *F24F 11/58* (2018.01); *F24F 2110/10* (2018.01); *F24F 2120/00* (2018.01); *F24F 2120/12* (2018.01); *G05B 2219/2642* (2013.01); *G06F 2203/011* (2013.01)

(58) Field of Classification Search
CPC combination set(s) only.
See application file for complete search history.

(56) References Cited

U.S. PATENT DOCUMENTS

| | | |
|---|---|---|
| 7,028,912 B1 | 4/2006 | Rosen |
| 9,239,963 B2 | 1/2016 | Irie |

(Continued)

OTHER PUBLICATIONS http://www.omron.com/media/press/2013/09/e0917.html, "OMRON to Launch New Image Sensing Component for Easy Interpretation . . . ," 4 pages, Sep. 17, 2013.

*Primary Examiner* — Deeprose Subedi
(74) *Attorney, Agent, or Firm* — Shumaker & Sieffert, P.A.

(57) ABSTRACT

The disclosure reveals a human machine interface that may incorporate an electronics module and display, a camera module connected to the electronics module, and an image processor connected to the camera module. The camera module may detect a person at the electronic module. An image of the person from the camera module may go to the image processor that outputs factors about the person from the image. The factors may go to the electronics module that automatically configures the display with a presentation that comports to the factors including style and information about the user. The electronic module may be a thermostat. The display may indicate temperature settings and temperatures of rooms in a house. Contents of the display may be derived from a context based interaction between the person and electronic module. The interface may further incorporate a cloud having analytics connected to the image processor and camera module.

20 Claims, 10 Drawing Sheets

(51) Int. Cl.
*G06F 3/16* (2006.01)
*F24F 11/30* (2018.01)
*F24F 11/64* (2018.01)
*F24F 11/70* (2018.01)
*G06F 3/0482* (2013.01)
*F24F 110/10* (2018.01)
*F24F 120/12* (2018.01)
*F24F 11/58* (2018.01)
*F24F 11/52* (2018.01)
*F24F 120/00* (2018.01)

(56) References Cited

U.S. PATENT DOCUMENTS

| | | |
|---|---|---|
| 9,291,359 B2 | 3/2016 | Fadell et al. |
| 2011/0116685 A1 | 5/2011 | Sugita |
| 2011/0135168 A1 | 6/2011 | Hosoi |
| 2016/0070987 A1 | 3/2016 | Irie et al. |
| 2016/0116182 A1 | 4/2016 | Hoppe et al. |
| 2018/0087795 A1* | 3/2018 | Okita ................ F24F 11/30 |
| 2018/0267701 A1* | 9/2018 | Rigg ............... G06F 3/04847 |
| 2018/0285767 A1* | 10/2018 | Chew ............... H04L 67/1097 |
| 2018/0299153 A1* | 10/2018 | Ajax ................ G05B 15/02 |

* cited by examiner

FIG. 1B

| Monday 16 April 12:00 |||| 
|---|---|---|---|
| Quick Actions  53 | Living Room  ⌛ | Kitchen  20° | Bedroom 2  20° |
| | 18° | 18° | 18° |
| Hot Water  45°  O | Dining Room  20° | Bedroom 1  20° | Bathroom  20° |
| | 18° | 18° | 18° |
| ⚙ SETTINGS | ▦ SCHEDULE || ≪ ≫ |

→ New Data
▷ Learnt Data

SMART HUMAN MACHINE INTERFACE

BACKGROUND

The present disclosure pertains to interfaces and particularly to interfaces that may identify a user and infer information about the user.

SUMMARY

The disclosure reveals a human machine interface that may incorporate an electronic module having an electronics module and display, a camera module connected to the electronics module, and an image processor connected to the camera module. The camera module may detect a person at the electronic module. An image of the person from the camera module may go to the image processor. The image processor may output factors about the person from the image of that person. The factors may go to the electronics module that automatically configures the display with a presentation that comports to the output factors including style and information about the user. The display may also indicate temperature settings and temperatures of one or more rooms in a house. In general, contents of the display may be derived from a context based interaction between the person and electronic module. The interface may further incorporate a cloud connected to the image processor and camera module. Image analytics may be in the cloud for analyzing images from the camera module. The image analytics may drive a dynamic behavior of the interface. The electronic module may be a thermostat.

BRIEF DESCRIPTION OF THE DRAWING

FIG. 1b similarly shows blocks with temperatures of the rooms along with hot water and outside temperatures, and settings and schedules that may be selected;

DESCRIPTION

Figure 1A:
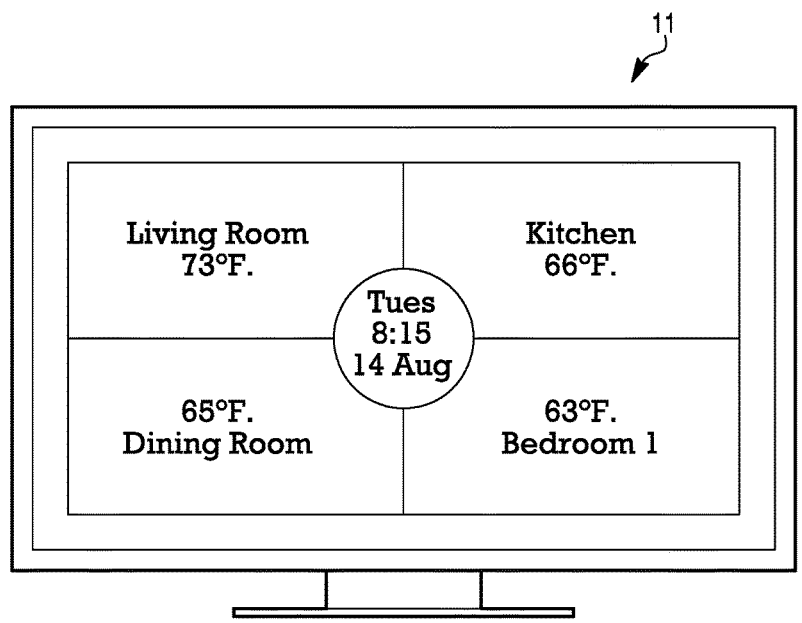
FIG. 1a is a diagram of a thermostatic display that simultaneously shows temperatures in various rooms of a house.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

Currently, there may be screen based devices (i.e., thermostats, wall modules, hand held devices with a screen, and so forth), which have very static interactions. They may be customizable through commissioning only, but they are not necessarily smart enough to be adaptable as per user needs and context. Occasionally, this may lead to suboptimal user experience while interacting with the devices.

An issue with wall modules/screen based devices is that they are not necessarily dynamically adaptable to a user type and context. The present screen user interface might help a set of individuals in a house but may be challenging for an elderly person reading screen information both in terms of content and text format. They may feel that it is too cluttered and confusing or may face difficulty in reading the text. Similarly, it may not be very wise to expose a whole plethora of options to children, or elderly persons in a house. To achieve the customized view through a PIN or any user triggered action may not be necessarily very user friendly each time. Also, current devices cannot necessarily offer context based interactions. For example, if someone seems puzzled while interacting with a device, then the device should learn this issue and provide appropriate guidance and offer navigational help to accomplish the sought task. The present system may identify factors of a user of the device to aid in configuring the device for more optimal usage by the user.

The present smart edge platform or smart human machine interface may provide a strong competitive differentiation through an adaptive user interface and enablement to position the product as a premium segment.

There may be an attempt from another company to dynamically alter content, depending upon how far the person is from the thermostat. Screen data may automatically adapt a font size from large to small based on proximity. With the present smart edge platform, one may provide a more adaptive context based user interface.

The smart edge platform may be an independent subsystem comprising a camera and computation power combined with wired/wireless connectivity. The smart edge component may have cognitive image processing and analytics of human elements such as gender, age, expression, and so on. The component may also be enabled with a capability of self-learning through cloud connectivity.

The smart edge platform may be integrated with any user interfacing device, e.g., a desktop, mobile, wall display, and so forth. The platform may help a user to interact with a system in as natural way as possible through dynamically adjusting visual interactions. Audio interactions may also be detected and adjusted.

The present system may be demonstrated using a graphical thermostat for temperature control in the home. A use case initially may consider age and gender of the user.

In one scenario, a smart edge platform, integrated to a graphical thermostat, may detect an age of user captured through a camera, and dynamically change the screen layout, including increasing the font size to accommodate the age of the user.

In another scenario, a smart edge platform, integrated to a graphical thermostat, may detect a gender of user and change a screen element to pink/blue to indicate the gender.

The present system may have a software component. A stack level may be a hardware device with embedded software that can be connected securely to the cloud via a wired or wireless connection. The embedded software may run in a device or unit (e.g., firmware). The system may have an IoT (Internet of Things) component. The stack level may be incorporate analytics which may implement data manipulation to gain information (e.g., a trend and predictive analytics tool).

Figure 1C:
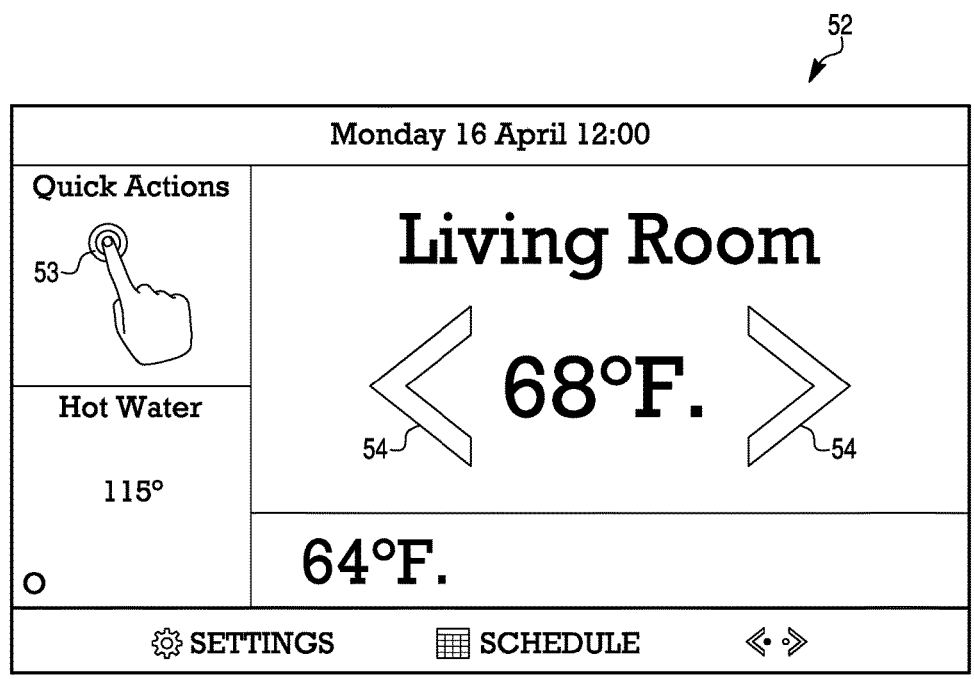
FIG. 1c is a diagram of one of the temperature blocks, such as that representing the living room, that may be selected for enlargement and revealing greater detail of information.

FIG. 1a is a diagram of a thermostatic display 11 that simultaneously shows temperatures in various rooms of a house. Display 11 may show the date and other information. A diagram in FIG. 1b similarly shows blocks with temperatures of the rooms. Added may be a temperature indication of hot water in the house plumbing system, and settings and schedules that may be selected. An outside temperature near the house may be indicated. A push button for quick actions relative to information to or detected by the display may be available. FIG. 1c is a diagram of one of the temperature blocks, such as that representing the living room, that may be selected for enlargement and revealing greater detail of information. Besides room temperature, symbols 54 may indicate a gender of the observer or user with a color, such as pink or blue, dark or light shadings, blinking fast or slow, or other distinguishing symbol properties. Also, age and other factors of the observer or user may be detected and displayed.

The diagrams of FIGS. 1a, 1b and 1c may be dynamic to meet a user's needs. For instance, an overall font size and screen layout expectation from people of varying age groups or distances from the display, may change significantly. The expectations may be achieved with the present displays. Technology of the present system and approach may change the user interface based on age group, gender, face recognition, and other detected factors.

Figure 2:
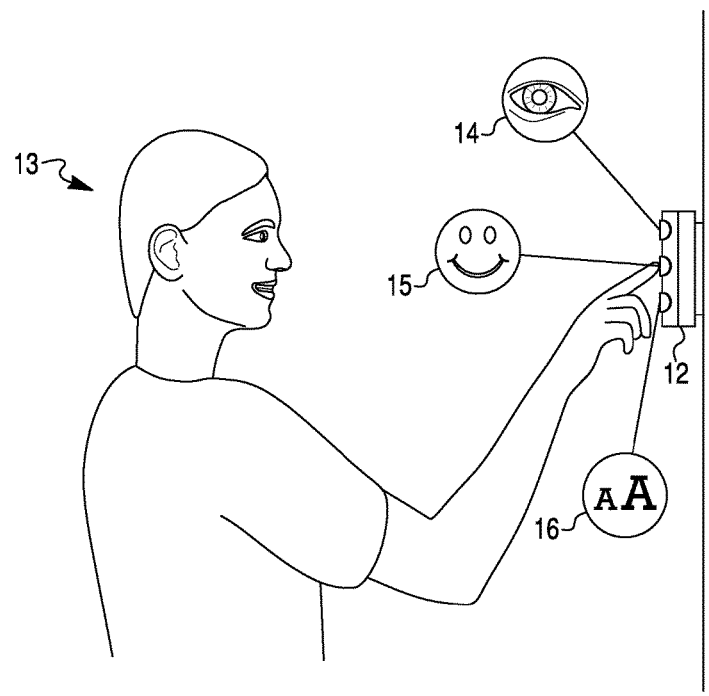
FIG. 2 is a diagram of an interface having a display with sensors.

FIG. 2 is a diagram of an interface 12 having a display with sensors. A user 13 may use interface 12 which may use a camera along with powerful analytics through libraries that can enable face recognition, age detection, gesture, gender, and expression to make interaction dynamic and content based. Interface 12 may make eye contact 14 with user 13, remember user 12 by name 15, and adapt for user 13 and situational needs with personal preferences 16. Interface 12 may have an audio sensor or component.

Figure 3:
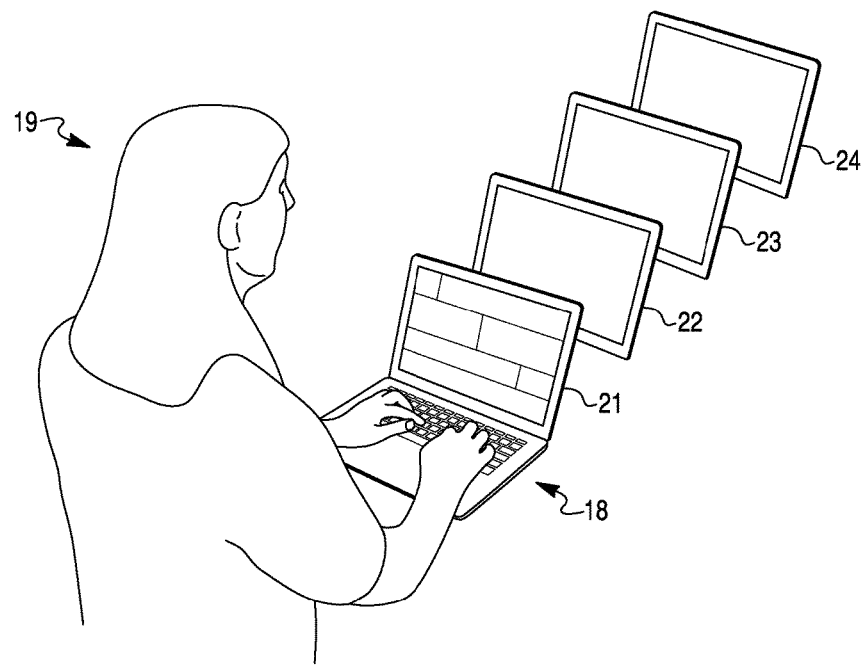
FIG. 3 and FIG. 3a are diagrams of an interface that may work with four layers of information.
Figure 3A:
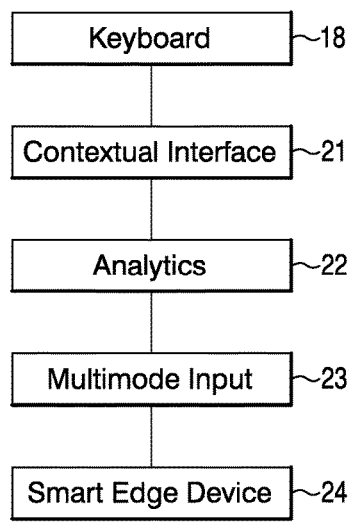

An interface 18 of a diagram in FIG. 3, may work with four layers of information. Interface 18 may identify a user 19 by a name "Mary Smith", as a female, and with a happy disposition. The layers of information may incorporate a contextual interface 21, analytics 22, a multimode input 23 (e.g., gesture, voice), and a smart (edge) device 24. FIG. 3a is a block diagram of keyboard 18, contextual interface 21, analytics 22, multimode input 23 and smart edge device 24.

Figure 4:
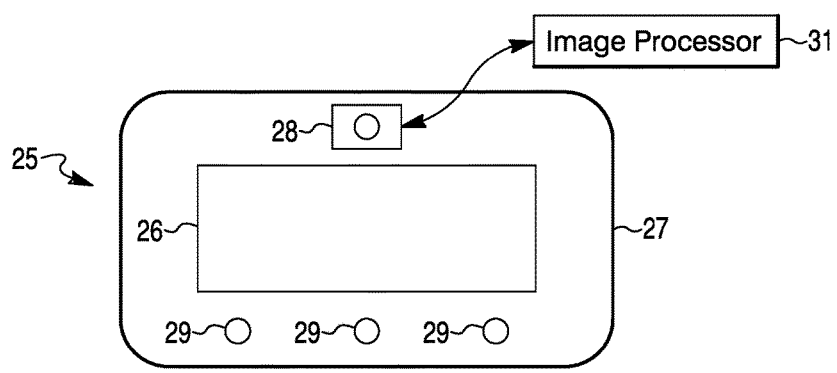
FIG. 4 and FIG. 4a are diagrams of an interface having a display and camera situated in a structure or frame.
Figure 4A:
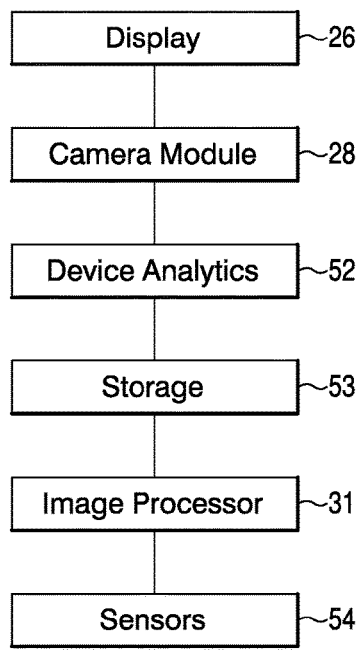

FIG. 4 is a diagram of an interface 25. Interface 25 may have a display 26 situated in a structure or frame 27. A camera module 28 and audio component may be situated in frame 27. There may be control knobs or buttons 29 for set points or adjustments, situated at frame 27. Within frame 27 may be electronics, such as those on a printed circuit board (PCB), connected to display 26, camera module 28, device analytics and storage. An image processor 31, connected to camera 28 and the electronics, may provide detection and interpretation of intentions and conditions of people detected by camera module 28 and audio device. Interface 25 may have local sensing and analytics. Interface 25 may be responsive to sensed data that can be matched to predetermined criteria. FIG. 4a is a block diagram of display 26, camera module 28, device analytics 52, storage 53, image processor 31, and sensors 54.

Figure 5:
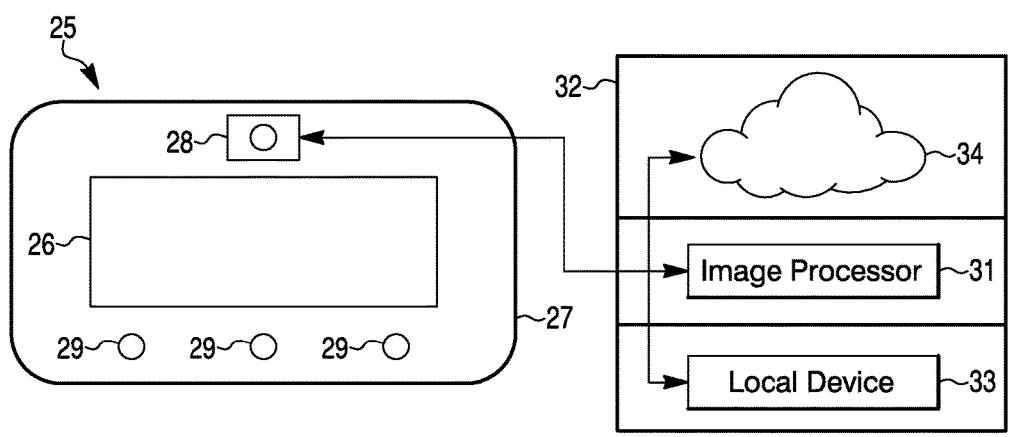
FIG. 5 and FIG. 5a are diagrams of an interface and its interaction with cloud connectivity.
Figure 5A:
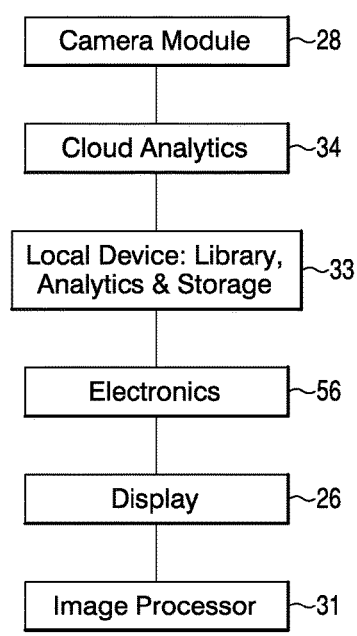

FIG. 5 is a diagram of interface 25 and its interaction with cloud connectivity as indicated by an item 32. Image processor 31, such as an OMRON™ human vision component (HVC), Microsoft™/Amazon™ face application programming interfaces (APIs), and the like, may have a connection with a local device 33 and a cloud 34. Local device 33 may incorporate a library, device analytics and storage. A pinhole camera may be added to interface 25. Image analytics may be in cloud 34 or be split between device 33 and cloud 34. Analytics may drive a dynamic behavior of interface 25. FIG. 5a is a diagram of camera module 28, cloud analytics 34, local device of library, analytics and storage 33, electronics 56, display 26 and image processor 31.

Figure 6:
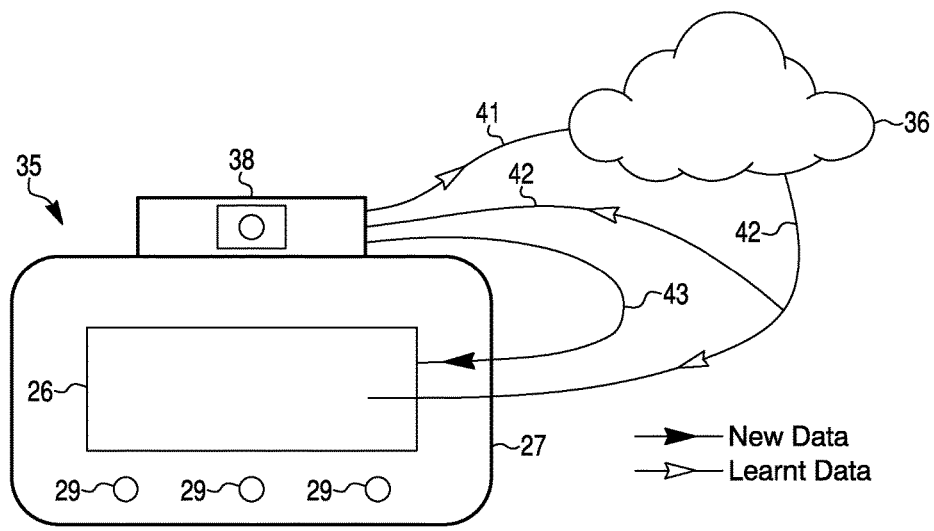
FIG. 6 and FIG. 6a are diagrams of an interface having an externally attachable camera module that may be situated on top of a frame.
Figure 6A:
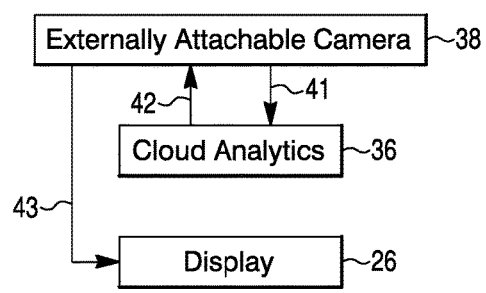

FIG. 6 is a diagram of an interface 35. An externally attachable camera module 38 may be situated on top of frame 27 of interface 35. A connection 41 may go from camera module 38 to a cloud 36 with analytics, which can incorporate cognitive services of Microsoft™. A connection 42 may go from cloud 36 to camera module 38 and display 26. Connections 41 and 42 may carry new data. A connection 43 may go from camera module 38 to display 26. Connection 43 may carry learnt data. Attachable camera module 38 may have a built-in camera, an audio sensor, computing capability, learning capability and connectivity. Module 38, which can be detachable, may learn through cloud 36. Module 38 may be used independently when not docked to a thermostat, such as that of interface 35. Module 38 may drive interface 35 dynamically based on factors sensed and/or not sensed. FIG. 6a is a diagram of externally attachable camera 38, cloud analytics 36 and display 26, with connections 41, 42 and 43.

Figure 7:
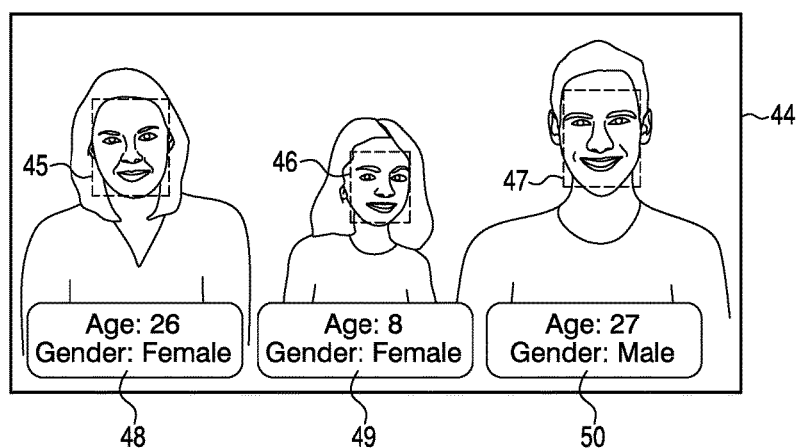
FIG. 7 is a diagram of a picture of several people with face captures performed with analytics for revealing information of the respective persons.

FIG. 7 is a diagram of a picture 44 of several subjects such as people. Face captures 45, 46 and 47 with analytics, such as face recognition, applied to them may reveal information of the respective persons such as age and gender. Sound of the subjects may be detected and have analytics applied and factors determined or corroborated. The information may be revealed in picture 44 with captions 48, 49 and 50. There may be other information, such as disposition, intention, facial expressions, gaze estimation, hand detection, conditions, and admission by face recognition. Functions of the sensing component may incorporate face detection, human body detection, gender estimation, age estimation, face recognition, estimation of facial expressions (e.g., satisfaction, dissatisfaction, happiness, surprise, anger, sadness, and/or indifference), hand detection, blink estimation, voice, and so on. The features may relate to a human vision component (HVC). An example of such component may be an HVC by OMRON™ Corporation of Japan.

To recap, a human machine interface may incorporate a frame, a display situated in the frame, a thermostat including a processor situated within the frame and connected to the display, and one or more sensors connected to the processor and situated in the frame. The one or more sensors may incorporate a camera. The camera may detect and provide an image of the user. The processor may determine with image analytics one or more factors of a user of the interface. A screen layout for the display may be automatically changed according the one or more factors determined of the user.

The interface may further incorporate a cloud connected to the processor of the thermostat. The cloud may incorporate image analytics.

The one or more factors may be from a group incorporating face recognition, gaze, hand detection, voice recognition, gender, age, facial expressions, blinking, disposition, and intentions.

A human machine interface may incorporate a first device including an electronics module and display, a camera module connected to the electronics module, and an image processor connected to the camera module. The camera module may detect a person at the first device. An image of the person from the camera module may go to the image processor. The image processor may output factors about the user from the image of the person. The factors may go to the electronics module that automatically configures the display with a presentation that comports to the output factors about the user.

Contents of the display may be based on a context based interaction between the user and the first device.

The interface may further incorporate a second device connected to the image processor and the camera module. The second device may incorporate a library, analytics and storage.

The interface may further incorporate a cloud connected to the image processor, camera module and the second device.

Image analytics may be in the cloud for analyzing images from the camera module.

Image analytics may be split between the second device and the cloud for analyzing images from the camera module.

The image analytics may drive a dynamic behavior of the interface.

The first device may be a thermostat. The camera module may incorporate a pin-hole camera or a lens camera.

An interface system may incorporate an electronic module having a display, and an attachable camera module connected to the electronic module. The attachable camera module may be connected to a cloud. The cloud may be connected to the electronic module. The cloud may incorporate analytics. The attachable camera module may obtain an image of a person near the electronic module. Features in the image may be detected and interpreted by the analytics to automatically indicate a configuration to be presented on the display.

New data may go from the attachable camera module to the cloud. New data may go from the cloud to the attachable camera module and the electronic module. Learnt data may go from the attachable camera module to the electronic module.

The electronic module may be a thermostat. The display may indicate temperature settings and temperatures of one or more rooms in a house. The display may show an image of one or more users or people at the electronic module. The image may be captured by the camera module. The analytics may derive face recognition from the image of the one or more users or people. The analytics may incorporate cognitive services to determine emotions from a face.

The electronic module may incorporate a display. The attachable camera module may capture an image of one or more subjects. The analytics may derive age and gender of the one or more subjects.

The analytics may derive one or more factors from the image about the one or more subjects from a group incorporating face detection or recognition, age, gender, human body detection, and facial expressions.

The facial expressions may be from a group incorporating satisfaction, happiness, dissatisfaction, surprise, fear, anger, sadness, contempt, disgust, indifference, neutrality, distraughtness and excitement.

The electronic module may further incorporate a microphone. The microphone may detect sound from the one or more users or people at the electronic module. The analytics may derive voice recognition from the sound of the one or more users or people.

Commands may be detected from the sound of the one or more users or people. The commands may go to control the electronic module or configure the display.

The system may further incorporate a proximity sensor to determine a position of a user relative to the display.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A human machine interface comprising:
   a frame;
   a display situated in the frame;
   a thermostat comprising a processor situated within the frame and connected to the display; and
   one or more sensors connected to the processor and situated in the frame; and
   wherein:
     the one or more sensors comprise a camera;
     the camera is configured to detect a user of the human machine interface and provide an image of the detected user to image analytics;
     the processor is configured to determine, with image analytics, one or more factors of the detected user from the image of the detected user, wherein the one or more factors comprise one or more of a gender of the detected user, an age of the detected user, or facial expressions of the detected user; and
     the processor is configured to automatically change a screen layout for the display according to the one or more factors determined of the detected user.

2. The interface of claim 1, wherein the processor is configured to:
   supply the image to a cloud, wherein the cloud comprises image analytics; and
   receive the one or more factors from the cloud.

3. The interface of claim 2, wherein the one or more factors further include one or more of face recognition, gaze, hand detection, voice recognition, blinking, disposition, or intentions.

4. A human machine interface comprising:
   a first device comprising electronics and a display;
   a camera connected to the electronics; and
   a processor connected to the camera; and
   wherein:
     the camera is configured to detect a user of the human machine interface at the first device and provide an image of the detected user to the processor;
     the processor is configured to output one or more factors about the detected user from the image of the detected user, wherein the one or more factors comprise one or more of a gender of the detected user, an age of the detected user, or facial expressions of the detected user; and the electronics is configured to automatically configure the display with a presentation that comports to the one or more factors about the detected user.

5. The interface of claim 4, wherein contents of the display are based on a context based interaction between the detected user and the first device.

6. The interface of claim 4, further comprising:
a second device connected to the processor and the camera; and
the second device comprises a library, analytics, and storage.

7. The interface of claim 6, further comprising a cloud connected to the processor, camera, and the second device.

8. The interface of claim 7, wherein image analytics are in the cloud for analyzing images from the camera.

9. The interface of claim 7, wherein image analytics are split between the second device and the cloud for analyzing images from the camera.

10. The interface of claim 8, wherein the processor is configured to:
supply the image of the detected user to image analytics; and
receive the one or more factors from the image analytics.

11. The interface of claim 4, wherein:
the first device is a thermostat; and
the camera comprises a pin-hole camera or a lens camera.

12. An interface system comprising:
electronics connected to a display; and
an attachable camera connected to the electronics; and
wherein:
the attachable camera is connected to a cloud;
the cloud is connected to the electronics;
the cloud comprises image analytics;
the attachable camera is configured to obtain an image of a person near the electronics; and
the image analytics is configured to detect and interpret one or more factors of the person in the image to automatically indicate a configuration to be presented on the display, wherein the one or more factors comprise one or more of a gender of the person, an age of the person, or facial expressions of the person.

13. The system of claim 12, wherein:
new data goes from the attachable camera to the cloud;
new data goes from the cloud to the attachable camera and the electronic module; and
learnt data goes from the attachable camera to the electronics.

14. The system of claim 12, wherein:
a device comprising the electronics and the display is a thermostat;
the display is configured to indicate temperature settings and temperatures of one or more rooms in a house;
the display is configured to show an image of one or more users or people at the electronics;
the image is captured by the camera;
the image analytics is configured to derive face recognition from the image of the one or more users or people; and
the image analytics comprise cognitive services to determine emotions from a face.

15. The system of claim 12, wherein, to detect and interpret the one or more factors of the person, the image analytics is configured to
derive the age of the person and the gender of the person.

16. The system of claim 12, wherein the one or more factors further include one or more of face recognition, gaze, hand detection, voice recognition, blinking, disposition, or intentions.

17. The system of claim 12, wherein the facial expressions of the person are from a group comprising satisfaction, happiness, dissatisfaction, surprise, fear, anger, sadness, contempt, disgust, indifference, neutrality, distraughtness, and excitement.

18. The system of claim 12, wherein:
the electronics further comprises a microphone;
the microphone is configured to detect sound from the person; and
the image analytics is configured to derive voice recognition from the sound of the person.

19. The system of claim 18, wherein:
commands are detected from the sound of the person; and
the commands go to control the electronics or to configure the display.

20. The system of claim 12, further comprising a proximity sensor configured to determine a position of the person relative to the display.

* * * * *